(12) United States Patent
You et al.

(10) Patent No.: US 7,285,924 B2
(45) Date of Patent: Oct. 23, 2007

(54) DRIVING CIRCUIT FOR LCD BACKLIGHT LAMPS

(75) Inventors: Yong-Xing You, Shenzhen (CN); Hua Xiao, Shenzhen (CN); Jian-Hui Lu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/321,474

(22) Filed: Dec. 29, 2005

(65) Prior Publication Data

US 2006/0145634 A1    Jul. 6, 2006

(30) Foreign Application Priority Data

Dec. 30, 2004    (CN) .................... 2004 1 0091961

(51) Int. Cl.
*G05F 1/00* (2006.01)
(52) U.S. Cl. .................. 315/308; 315/299; 315/224; 315/210
(58) Field of Classification Search ............. 315/224, 315/291, 307, DIG. 5, 209 R, 210, 212, 219, 315/223–226, 299, 308, 312; 345/82, 102
See application file for complete search history.

(56) References Cited

U.S. PATENT DOCUMENTS

| | | | | |
|---|---|---|---|---|
| 5,747,941 A | * | 5/1998 | Shackle et al. ............. | 315/224 |
| 6,104,146 A | * | 8/2000 | Chou et al. ................. | 315/277 |
| 6,326,740 B1 | * | 12/2001 | Chang et al. ............... | 315/291 |
| 6,459,216 B1 | * | 10/2002 | Tsai ........................... | 315/294 |
| 6,570,344 B2 | * | 5/2003 | Lin ............................. | 315/224 |
| 6,812,916 B2 | | 11/2004 | Hwang ....................... | 345/102 |
| 6,856,099 B2 | * | 2/2005 | Chen et al. ................. | 315/224 |

* cited by examiner

Primary Examiner—Douglas W. Owens
Assistant Examiner—Jimmy Vu
(74) Attorney, Agent, or Firm—Morris Manning Martin LLP; Tim Tingkang Xia, Esq.

(57) ABSTRACT

An LCD backlight driving circuit is provided for providing protection to LCD backlight lamps. In a preferred embodiment, the driving circuit for LCD backlight lamps comprises: a PWM controller sending control signals; two transistors receiving the control signals and sending two low-voltage pulse signals; an inverter converting the two low-voltage pulse signals to a high-voltage AC (Alternating Current) power; two lamps; two overvoltage protection circuits connected to the two lamps respectively; a voltage feedback module connected to the two lamps, a current feedback module connected to one of the two lamps; and a double-bridge circuit connected between the two lamps, and connected to the current feedback module for controlling the PWM controller to turn-on or turn-off. The driving circuit is capable of providing defective connection protection and open-circuit protection to LCD backlight lamps, and proportionately adjusting current flowing through the lamps.

11 Claims, 2 Drawing Sheets

DRIVING CIRCUIT FOR LCD BACKLIGHT LAMPS

BACKGROUND

1. Field of the Invention

The present invention relates to a driving circuit for LCD (Liquid Crystal Display) backlight lamps, and particularly to a driving circuit for providing defective connection protection and open-circuit protection to LCD backlight lamps, and proportionately adjusting current flow through the lamps.

2. General Background

Typically, a transmission type LCD uses a backlight lamp to provide light for illuminating pixels to display data or information. In addition, because a high voltage of about 1000-1500V is required to drive a backlight lamp, low-voltage power supplied from a main supply should be converted. For satisfying this requirement, a driving circuit for backlight lamps such as FIG. 2 is used.

Referring to FIG. 2, a typical driving circuit for LCD backlight lamps includes a PWM (Pulse Width Modulation) controller 10, a first transistor Q1, a second transistor Q2, a center-tapped transformer 20, a first lamp 30, a second lamp 40, a first overvoltage protection module 50, a second overvoltage protection module 60, a voltage feedback module 70, and a current feedback module 80.

The PWM controller 10 sends a first PWM control signal to the first transistor Q1, and a second PWM control signal to the second transistor Q2. The first transistor Q1 and the second transistor Q2 are turned on alternately. Then the first transistor Q1 and the second transistor Q2 generate two low-voltage pulse signals. The two low-voltage pulse signals are sent to primary windings of the center-tapped transformer Q2. The center-tapped transformer 20 converts the two low-voltage pulse signals to a high-voltage AC power. The high-voltage AC power is sent to the first lamp 30 and the second lamp 40. A resistor R8 is connected between a cathode of the first lamp 30 and ground. The first overvoltage protection module 50 provides overvoltage protection to the first lamp 30. The second overvoltage protection module 60 provides overvoltage protection to the second lamp 40. The voltage feedback module 70 receives signals from the first lamp 30 and the second lamp 40, and then controls an output signal of the PWM controller 10. The current feedback module 80 is coupled to the first lamp 30, and then controls the output signal of the PWM controller 10.

When the first lamp 30 works normally, and the second lamp 40 has a defective connection or an open-circuit, the current flowing through the second lamp 40 is zero in theory. However, because of the electric field effect a small current is still flowing through the second lamp 40, and a current flowing through the first lamp 30 is very large. Because the current flowing through the first lamp 30 is very large, a voltage of a resistor R8 is high. The voltage of the resistor R8 is fed back to the voltage feedback module 70. The voltage feedback module 70 outputs a high voltage, and the PWM controller 100 continues to work normally. So the first lamp 30 is still lit. As a result, the first lamp 30 can become disabled prematurely. The driving circuit for the LCD backlight lamps does not protect the first lamp 30 when the second lamp 40 gets a defective connection or an open-circuit. Therefore reliability of the lamps is reduced.

When a current of the first lamp 30 is greater than a current of the second lamp 40, or the current of the second lamp 40 is greater than the current of the first lamp 30, the driving circuit for the LCD backlight lamps does not maintain balance between the currents of the first lamp 30 and the current of the second lamp 40. As a result, one of the first lamp 30 and the second lamp 40, the current of which is larger, can become disabled prematurely.

What is needed, therefore, is a driving circuit for LCD backlight lamps able to provide defective connection protection and open-circuit protection to every lamp, and proportionately adjusting current flow through the lamps.

SUMMARY

An LCD backlight driving circuit is provided for providing protection to LCD backlight lamps. In a preferred embodiment, the driving circuit for LCD backlight lamps includes a PWM controller sending control signals; two transistors receiving the control signals and sending two low-voltage pulse signals; an inverter converting the two low-voltage pulse signals to a high-voltage AC (Alternating Current) power; two lamps, wherein each of the lamps receives the high-voltage AC power and then is grounded; two overvoltage protection circuits, wherein the two voltage protection circuits are connected to the two lamps respectively; a voltage feedback module connected to the two lamps, and controlling power to the PWM controller; a current feedback module connected to one of the two lamps, and also controlling the PWM controller to be turned on or turned off and a double-bridge circuit connected between the two lamps, and connected to the current feedback module for controlling the PWM controller to be turned on or turned off as well.

The driving circuit is capable of providing defective connection protection and open-circuit protection to LCD backlight lamps, and proportionately controlling current flowing through the lamps.

Other advantages and novel features will become more apparent from the following detailed description of preferred embodiments when taken in conjunction with the accompanying drawings, in which:

DETAILED DESCRIPTION OF THE EMBODIMENTS

Figure 1:
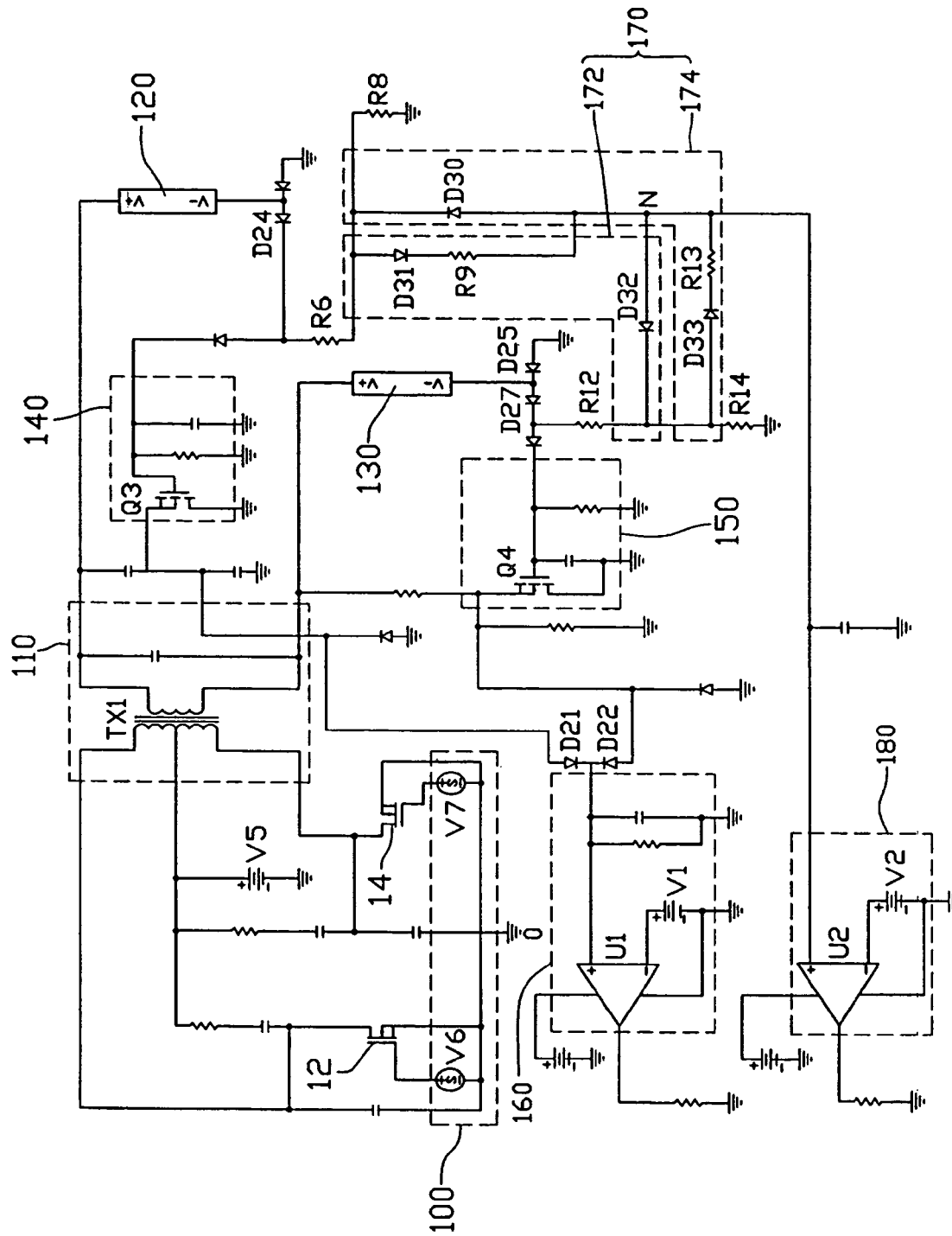
FIG. 1 is a circuit diagram of a driving circuit for LCD backlight lamps of a preferred embodiment of the present invention.
Figure 2:
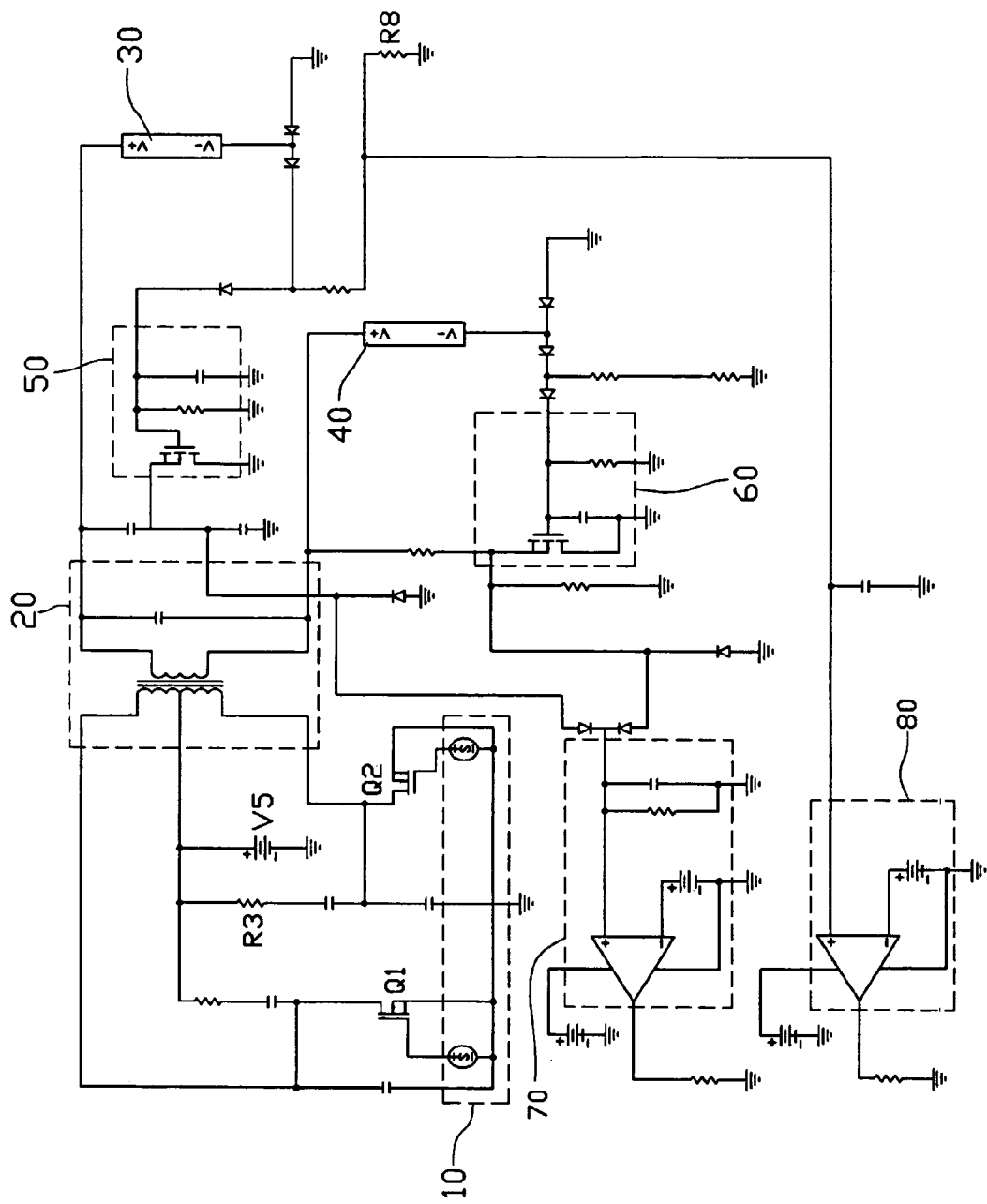
FIG. 2 is a circuit diagram of a typical driving circuit for LCD backlight lamps.

As shown in FIG. 1, in a preferred embodiment of the present invention, a driving circuit for LCD backlight lamps includes a PWM controller 100, an inverter 110, two transistors 12, 14, a first illuminator like a first lamp 120, a second illuminator like a second lamp 130, a first overvoltage protection module 140, a second overvoltage protection module 150, a voltage feedback module 160, a double-bridge circuit 170, and a current feedback module 180.

The PWM controller 100 includes two voltage sources V6, V7. The voltage sources V6, V7 send PWM control signals to the two transistors 12, 14 respectively. The two transistors 12, 14 are MOSFETs (metal-oxide-semiconductor field-effect transistors). Gates of the two transistors 12, 14 are connected to anodes of the two voltage sources V6, V7 respectively. Sources of the two transistors 12, 14 are connected to cathodes of the two voltage sources V6, V7 respectively. The two transistors are turned on alternately. The inverter 110 includes a transformer TX1. The transformer TX1 is a center-tapped transformer. Drains of the two transistors 12, 14 are coupled to two ends of primary windings of the transformer TX1 respectively. A center tap of the primary windings is coupled to a voltage source V5. The voltage source V5 provides a 12V voltage. Anodes of the first lamp 120 and the second lamp 130 are connected to two ends of secondary windings of the transformer TX1 respectively. A cathode of the first lamp 120 is grounded via a diode D24, a resistor R6, a diode D31, a resistor R9, a diode D32, and a resistor R14. A cathode of the second lamp 130 is grounded via a diode D27, a resistor R12, and the resistor R14.

The first overvoltage protection module 140 is connected to the anode of the first lamp 120 for detecting a voltage of the first lamp 120. The first overvoltage protection module 140 includes a MOSFET Q3. A gate of the MOSFET Q3 is coupled to a cathode of the diode D24. A source of the MOSFET Q3 is coupled to the anode of the first lamp 120. A drain of the MOSFET Q3 is grounded. The second overvoltage protection module 150 is connected to the anode of the second lamp 130 for detecting a voltage of the second lamp 130. The second overvoltage protection module 150 includes a MOSFET Q4. A gate of the MOSFET Q4 is coupled to a cathode of the diode D27. A source of the MOSFET Q4 is coupled to the anode of the second lamp 130. A drain of the MOSFET Q4 is grounded.

The voltage feedback module 160 includes an amplifier U1. A cathode of the diode D21 is connected to a non-inverting input terminal of the amplifier U1. An anode of the diode D21 is coupled to the anode of the first lamp 120. A cathode of the diode D22 is connected to the non-inverting input terminal of the amplifier U1. An anode of the diode D22 is coupled to the anode of the second lamp 130. An inverting terminal of the amplifier U1 receives a voltage reference V1.

The double-bridge circuit 170 is coupled to the cathode of the first lamp 120 via the diode D24 and the resistor R6, and grounded via the resistor R14. The double-bridge circuit 170 includes a first branch circuit 172, and a second branch circuit 174. The first branch circuit 172 includes the diode D31, the resistor R9, and the diode D32. A cathode of the diode 31 is connected to the resistor R6 and the resistor R8, and an anode of the diode 31 is connected to the resistor R9. A cathode of the diode 32 is connected to the resistor R9, and an anode of the diode 32 is connected to the resistor R12 and the resistor R14. The second branch circuit 174 includes a diode D30, a resistor R13, and a diode D33. An anode of the diode 30 is connected to the resistor R6 and a resistor R8, and a cathode of the diode 30 is connected to the resistor R13. An anode of the diode 33 is connected to the resistor R13, and a cathode of the diode 33 is connected to the resistor R12 and the resistor R14.

A node N between the diode D30 and the resistor R9 is connected to the current feedback module 180. The current feedback module 180 includes an amplifier U2. A non-inverting terminal of the amplifier U2 is connected to the node N. An inverting terminal of the amplifier U2 receives a voltage reference V2. The voltage reference V2 is 0.55V.

The PWM controller 100 controls the two transistors 12, 14 in generating two low-voltage pulse signals. The transformer TX1 converts the two low-voltage pulse signals to a high-voltage AC power. The high-voltage AC power is sent to the first lamp 120 and the second lamp 130. The first overvoltage protection module 140 provides overvoltage protection to the first lamp 120. The second overvoltage protection module 150 provides overvoltage protection to the second lamp 130. The voltage feedback module 160 receives a voltage of the first lamp 120 and a voltage of the second lamp 130. And then the voltage feedback module 160 controls the PWM controller to be turned on or turned off. The current feedback module 180 receives a voltage from the node N, and then controls the PWM controller 100 to be turned on or turned off.

When both the first lamp 120 and the second lamp 130 work normally, the double-bridge circuit 170 is not operating.

When either the first lamp 120 or the second lamp 130 ceases to function normally, such as having a defective connection or an open-circuit, the double-bridge circuit 170 provides defective connection protection or open-circuit protection. Should the second lamp 130 have a defective connection, there will still be a small current flowing through it because of the electric field effect. However, a current of the first lamp 120 is great. The current of the first lamp 120 flows through the diode D24, the resistor R6, and then is divided into two parts. One part of the current of the first lamp 120 flows through the resistor R8 and then to ground. The remaining part of the current of the first lamp 120 flows through the first branch circuit 172, the resistor R14, and then to ground. When the voltage of the node N is lower than 5.5V, the current feedback module 180 outputs a low voltage. As a result, the PWM controller 100 is turned off and the first lamp 120 is turned off. When the voltage of the node N is higher than 5.5V, the current feedback module 180 outputs a high voltage. As a result, the PWM controller 100 continues functioning normally and the first lamp 120 is still lit. Similarly, when the first lamp 120 has a defective connection, and the second lamp 130 is functioning normally, the second lamp 130 will be protected. And if either the first lamp 120 or the second lamp 130 has an open-circuit, the voltage of the node N is zero and the PWM controller 100 is turned off, and then the second lamp 130 or the first lamp 120 is turned off.

When the current of the first lamp 120 is greater than the current of the second lamp 130, and a voltage of the diode D32 is greater than a turn-on voltage thereof, the diode D32 is turned on. Part of the current of the first lamp 120 flows through the first branch circuit 172, the resistor R14, and the ground. Then the current of the first lamp 120 goes down, and the current of the second lamp 130 increases. Contrarily, when the current of the second lamp 130 is greater than the current of the first lamp 120, part of the current of the second lamp 130 flows through the second branch circuit 174, the resistor R8, and then to ground. Then the current of the second lamp 130 goes down, and the current of the first lamp 120 increases. Therefore the double-bridge circuit 170 regulates the current, maintaining balance between the current of the first lamp 120 and the current of the second lamp 130.

In the illustrated embodiment, because the double-bridge circuit 170 provides two branches between the first lamp 120 and the second lamp 130, the current of the first lamp 120 or the second lamp 130 is divided into two parts. When one of the first lamp 120 and the second lamp 130 has a defective connection or an open-circuit, the voltage of the node N is lower than that of the typical driving circuit for LCD backlight lamps. Therefore the current feedback module 180 outputs a low voltage, and the PWM controller is turned off. Correspondingly, the one of the first lamp 120 and the second lamp 130 having the defective connection or the open-circuit is turned off. Similarly, when the current of the first lamp 120 is not equal to the current of the second lamp 130, the branches of the double-bridge circuit 170 regulate current flow to equalize the current of the first lamp 120 and the current of the second lamp 130.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An LCD (Liquid Crystal Display) backlight driving circuit comprising:
    a PWM (Pulse Width Modulation) controller sending controlling signals;
    two transistors receiving the controlling signals and sending two low-voltage pulse signals respectively;
    an inverter converting the two low-voltage pulse signals to a high-voltage AC (Alternating Current) power;
    two lamps, wherein each of the lamps receives the high-voltage AC power and then is grounded;
    two overvoltage protection circuits, wherein the two voltage protection circuits are connected to the two lamps respectively;
    a voltage feedback module connected to the two lamps, and controlling the PWM controller to be turned on or turned off;
    a current feedback module connected to one of the two lamps, and controlling the PWM controller to be turned on or turned off; and
    a double-bridge circuit connected between the two lamps, and connected to the current feedback module for controlling the PWM controller to be turned on or turned off, wherein the inverter comprises a center-tapped transformer, the center-tapped transformer converts the two low-voltage pulse signals to the high-voltage AC power.

2. The LCD backlight driving circuit as claimed in claim 1, wherein the double-bridge circuit comprises two branch circuits, and the two branch circuits are connected to each other in parallel.

3. The LCD backlight driving circuit as claimed in claim 2, wherein each of the two branch circuits comprises two diodes and a resistor, the two diodes and the resistor connected in series.

4. The LCD backlight driving circuit as claimed in claim 1, wherein the two transistors are MOSFETs (metal-oxide-semiconductor field-effect transistors).

5. An LCD (Liquid Crystal Display) backlight driving circuit comprising:
    a PWM (Pulse Width Modulation) controller sending two control signals, adapted to control two transistors respectively to be turned on alternately, and then sending two low-voltage pulse signals;
    an inverter converting the two low-voltage pulse signals to a high-voltage AC (Alternating Current) power;
    a first lamp receiving the high-voltage AC power and then being grounded;
    a second lamp receiving the high-voltage AC power and then being grounded;
    a current feedback module connected to one of the two lamps, and controlling the PWM controller to be turned on or turned off; and
    a double-bridge circuit connected between the first lamp and the second lamp, and connected to the current feedback module for controlling the PWM controller to be turned on or turned off, wherein the double-bridge circuit comprises a first branch circuit, and a second branch circuit, the first branch circuit is connected to the second branch circuit in parallel.

6. The LCD backlight driving circuit as claimed in claim 5, further comprising a voltage feedback module connected to the first lamp and the second lamp, and controlling the PWM controller to be turned on or turned off.

7. The LCD backlight driving circuit as claimed in claim 5, further comprising two overvoltage protection circuits, wherein the two overvoltage protection circuits are connected to the first lamp and the second lamp respectively.

8. The LCD backlight driving circuit as claimed in claim 5, wherein the first branch circuit comprises two diodes and a resistor, the two diodes and the resistor connected in series, and a current of the first bridge branch circuit flows from the first lamp to the second lamp.

9. The LCD backlight driving circuit as claimed in claim 5, wherein the second branch circuit comprises two diodes and a resistor, the two diodes and the resistor connected in series, and a current of the second bridge branch circuit flows from the second lamp to the first lamp.

10. The LCD backlight driving circuit as claimed in claim 7, wherein the inverter comprises a center-tapped transformer, the center-tapped transformer converts the two low-voltage pulse signals to the high-voltage AC power.

11. A multiple-illuminator system comprising:
    two illuminators out of a plurality of illuminators of said multiple-illuminator system;
    a controller electrically coupled to each of said two illuminators for controllably powering said each of said two illuminators for illumination thereof;
    a feedback module electrically coupled between said controller and said two illuminators for managing said controllably powering of said controller based on accepted signals from said each of said two illuminators; and
    a bridge circuit electrically coupled between said two illuminators for providing electrical current communication between said two illuminators so as to balance illumination ability between said two illuminators and electrically coupled to the feedback module for controlling the controller, wherein said bridge circuit comprises a first branch circuit and a second branch circuit electrically coupled with each other in parallel.

* * * * *